United States Patent
Yi et al.

(10) Patent No.: US 10,321,448 B2
(45) Date of Patent: Jun. 11, 2019

(54) METHOD AND APPARATUS FOR PERFORMING D2D OPERATION IN NON-ACTIVATED CARRIER IN WIRELESS COMMUNICATION SYSTEM

(71) Applicant: LG ELECTRONICS INC., Seoul (KR)

(72) Inventors: Yunjung Yi, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 15/319,507

(22) PCT Filed: Jun. 17, 2015

(86) PCT No.: PCT/KR2015/006141
§ 371 (c)(1),
(2) Date: Dec. 16, 2016

(87) PCT Pub. No.: WO2015/194857
PCT Pub. Date: Dec. 23, 2015

(65) Prior Publication Data
US 2017/0135074 A1    May 11, 2017

Related U.S. Application Data

(60) Provisional application No. 62/013,526, filed on Jun. 17, 2014, provisional application No. 62/016,110, (Continued)

(51) Int. Cl.
*H04W 72/04*   (2009.01)
*H04W 16/14*   (2009.01)
(Continued)

(52) U.S. Cl.
CPC ......... *H04W 72/042* (2013.01); *H04W 8/005* (2013.01); *H04W 16/14* (2013.01);
(Continued)

(58) Field of Classification Search
CPC ....... H04W 8/00; H04W 8/005; H04W 16/14; H04W 72/02; H04W 72/04;
(Continued)

(56) References Cited

U.S. PATENT DOCUMENTS 9,832,803 B2 *   11/2017   Fujishiro ............. H04W 72/048
9,991,983 B2 *    6/2018   Seo ........................ H04W 76/14
(Continued)

FOREIGN PATENT DOCUMENTS

CN    103416012 A    11/2013
CN    103430467 A    12/2013
(Continued)

OTHER PUBLICATIONS

"3GPP TS 36.300 V12.1.0 (Mar. 2014): 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Organizational Partners, 2014, 209 pages.
(Continued)

*Primary Examiner* — Tri H Phan
(74) *Attorney, Agent, or Firm* — Birch, Stewart, Kolasch & Birch, LLP

(57) ABSTRACT

A method and apparatus for performing device-to-device (D2D) operation in a wireless communication system is provided. A user equipment (UE) receives a signal for D2D operation, and performs the D2D operation in a non-activated carrier.

13 Claims, 8 Drawing Sheets

Related U.S. Application Data filed on Jun. 24, 2014, provisional application No. 62/030,606, filed on Jul. 29, 2014.

(51) Int. Cl.

| | | |
|---|---|---|
| *H04W 8/00* | (2009.01) | |
| *H04W 76/00* | (2018.01) | |
| *H04W 76/20* | (2018.01) | |
| *H04W 72/02* | (2009.01) | |
| *H04W 76/14* | (2018.01) | |
| *H04W 76/27* | (2018.01) | |

(52) U.S. Cl.
CPC ........... *H04W 72/02* (2013.01); *H04W 76/14* (2018.02); *H04W 76/20* (2018.02); *H04W 76/27* (2018.02)

(58) Field of Classification Search
CPC . H04W 72/042; H04W 76/02; H04W 76/023; H04W 76/04; H04W 76/14; H04W 76/20; H04W 76/00; H04W 76/27
See application file for complete search history.

(56) References Cited

U.S. PATENT DOCUMENTS

| | | | | |
|---|---|---|---|---|
| 10,098,149 | B2* | 10/2018 | Fujishiro | ............. H04W 72/048 |
| 2011/0151887 | A1 | 6/2011 | Hakola et al. | |
| 2013/0315152 | A1 | 11/2013 | Ratasuk et al. | |
| 2015/0312775 | A1* | 10/2015 | Yi | ......................... H04W 16/00 370/254 |
| 2015/0327183 | A1* | 11/2015 | Park | .................... H04W 52/383 370/311 |
| 2017/0041971 | A1* | 2/2017 | Kim | ....................... H04W 76/14 |
| 2017/0048041 | A1* | 2/2017 | Yi | ......................... H04L 5/0048 |
| 2017/0064534 | A1* | 3/2017 | Loehr | ................... H04W 72/04 |
| 2017/0105112 | A1* | 4/2017 | Park | .......................... H04L 5/00 |
| 2017/0118665 | A1* | 4/2017 | Park | ....................... H04W 24/08 |
| 2017/0164381 | A1* | 6/2017 | Kim | ...................... H04W 76/14 |
| 2017/0201898 | A1* | 7/2017 | Park | ....................... H04W 16/32 |

FOREIGN PATENT DOCUMENTS

| | | |
|---|---|---|
| CN | 103748907 A | 4/2014 |
| WO | WO 2011/069295 A1 | 6/2011 |
| WO | WO 2013/068788 A1 | 5/2013 |
| WO | WO 2013/181785 A1 | 12/2013 |
| WO | WO 2014/081262 A1 | 5/2014 |

OTHER PUBLICATIONS

Intel Corporation, "Discussion on RAN2 Aspects of D2D Discovery", R2-132823, 3GPP TSG-RAN2 Meeting #83, Barcelona, Spain, Aug. 2013, 7 pages.

Samsung, "Resource allocation for D2D broadcast communication", R1-140390, 3GPP TSG RAN WG1 Meeting #76, Feb. 2014, 7 pages.

LG Electronics, "Considerations on Supporting Inter-cell D2D Operations," 3GPP TSG RAN WG1 Meeting #76bis, R1-141360, Shenzhen, China, Mar. 31-Apr. 4, 2014 (EPO Server date Mar. 30, 2014), pp. 1-3, XP050787032.

LG Electronics, "Other Remaining Issues for D2D and WAN Co-existence," 3GPP TSG RAN WG1 Meeting #78, R1-143187, Dresden, Germany, Aug. 18-22, 2014 (EPO Server date Aug. 17, 2014), pp. 1-4, XP050788664.

LG Electronics, "Resource Allocation and UE Behavior for Discovery Type 1 and Type 2," 3GPP TSG RAN WG1 Meeting #74, R1-133388, Barcelona, Spain, Aug. 19-23, 2013 (EPO Server date Aug. 10, 2013), pp. 1-6, XP050716502.

* cited by examiner

[Fig. 1]
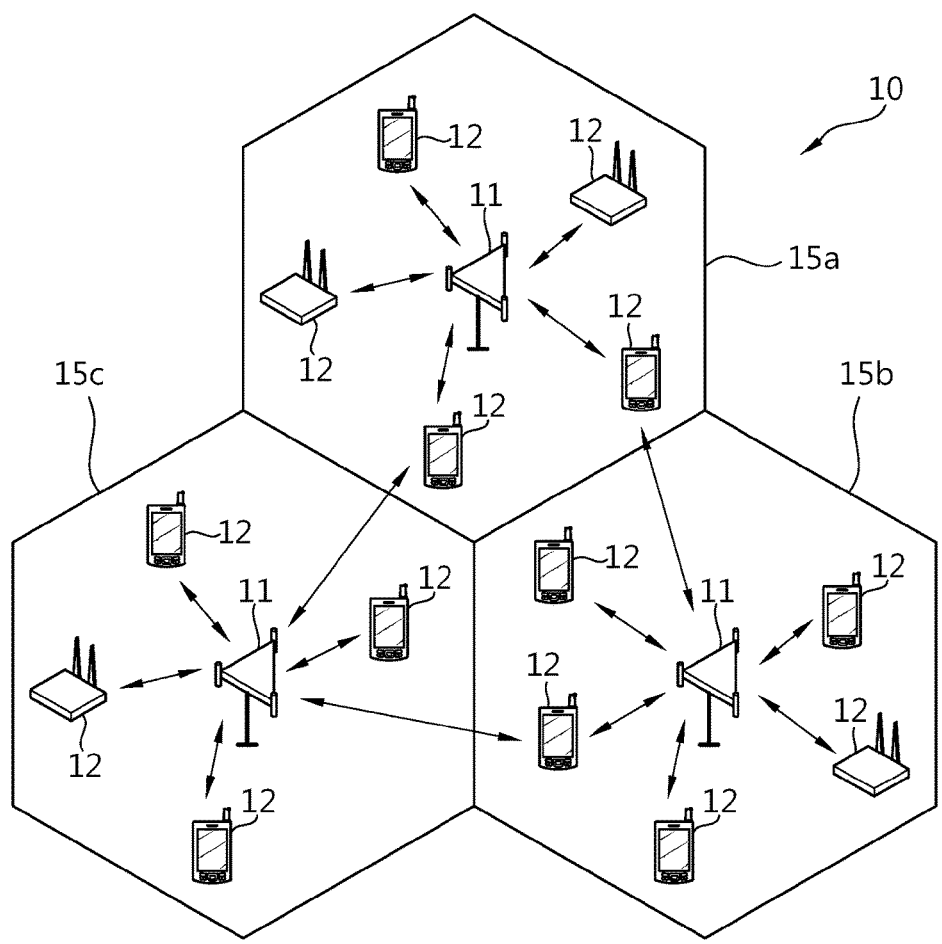
[Fig. 2]
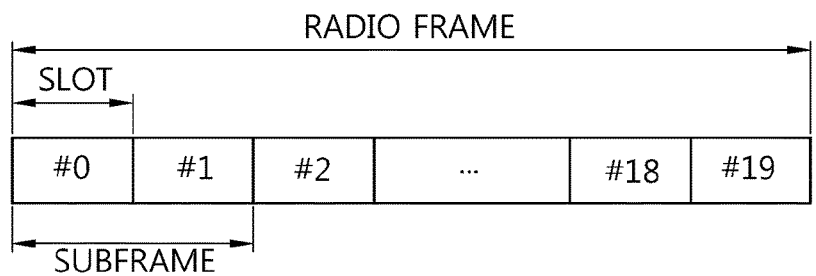

[Fig. 3]
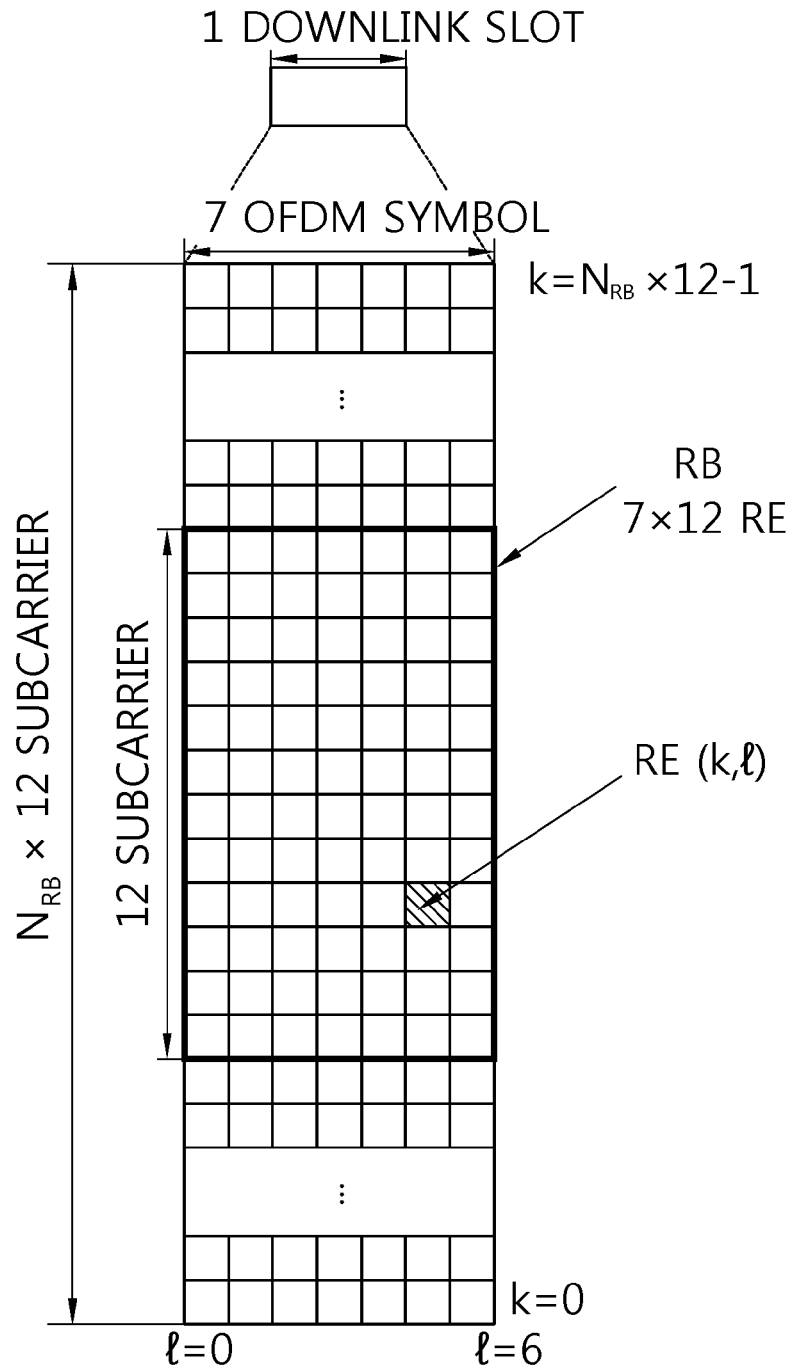

[Fig. 4]
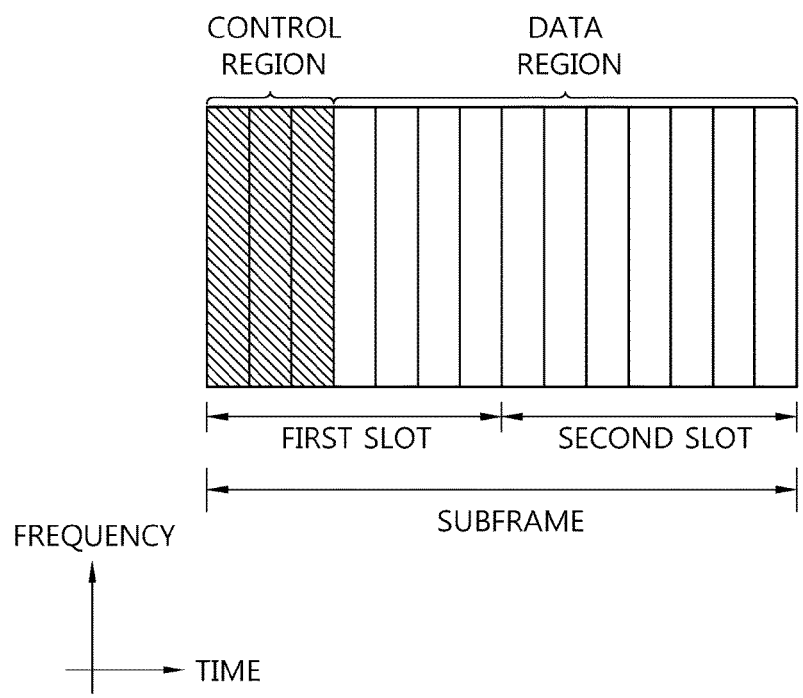

[Fig. 5]
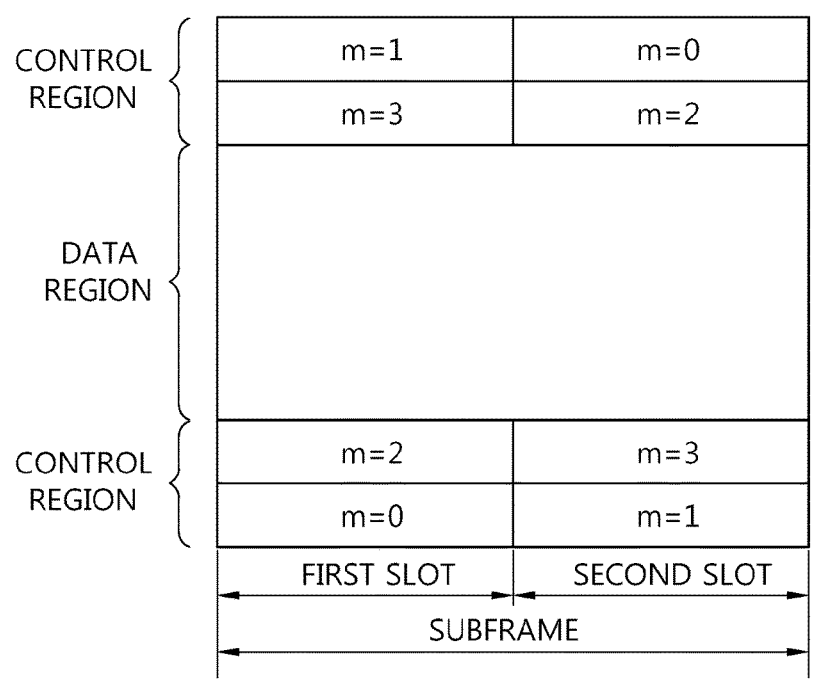
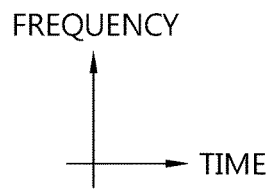

[Fig. 6]
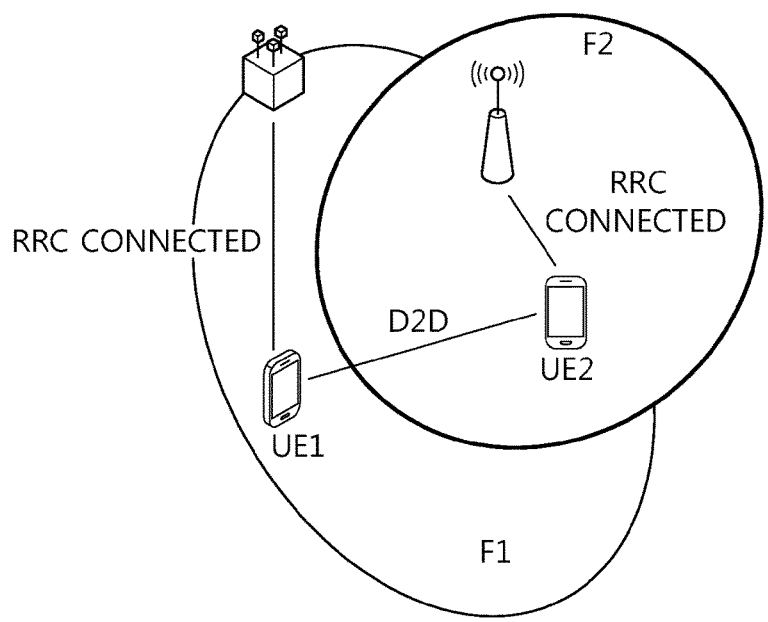
[Fig. 7]
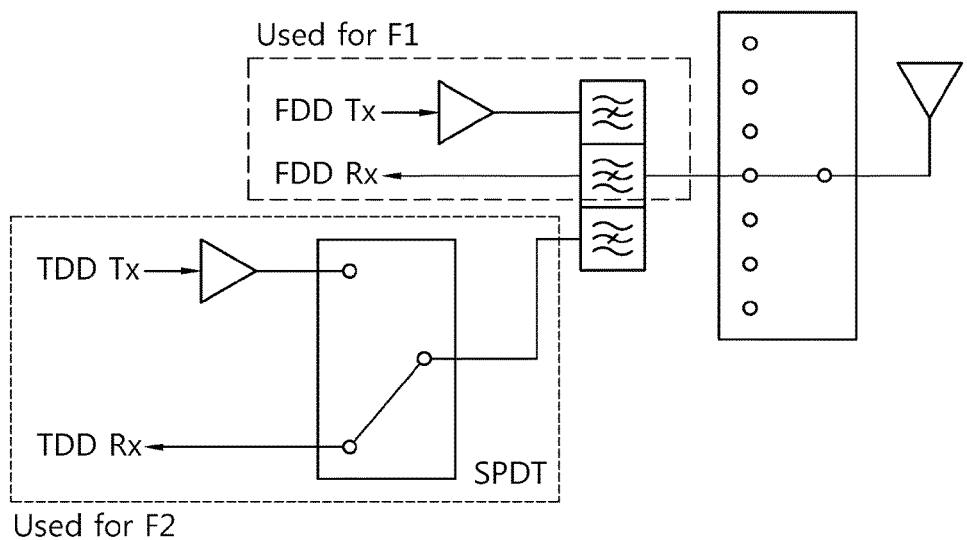

[Fig. 8]
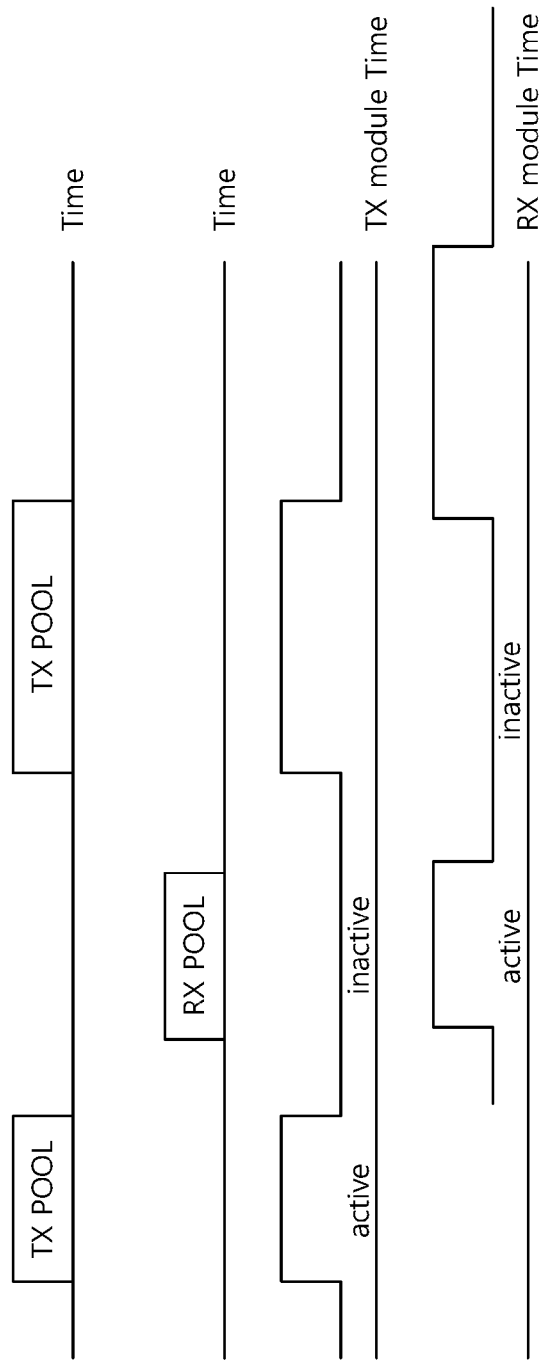

[Fig. 9]
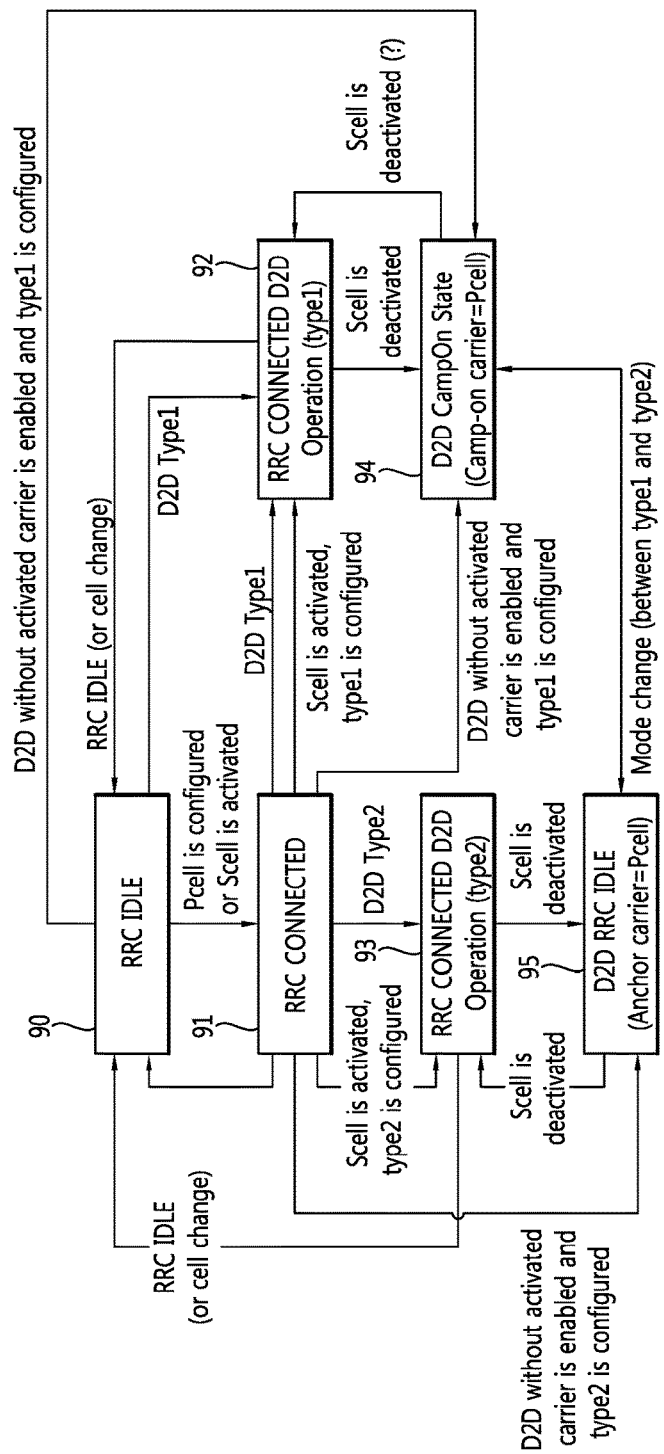

[Fig. 10]
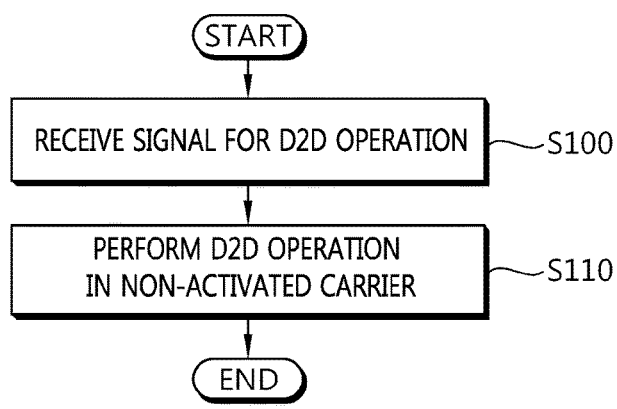
[Fig. 11]
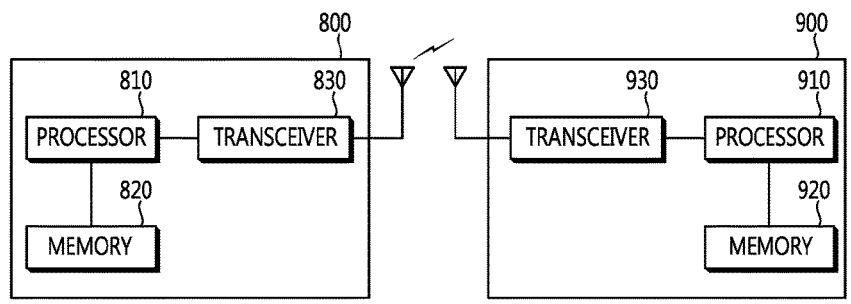

METHOD AND APPARATUS FOR PERFORMING D2D OPERATION IN NON-ACTIVATED CARRIER IN WIRELESS COMMUNICATION SYSTEM

CROSS REFERENCE TO RELATED APPLICATIONS

This application is the National Phase of PCT International Application No. PCT/KR2015/006141, filed on Jun. 17, 2015, which claims priority under 35 U.S.C. 119(e) to U.S. Provisional Application No. 62/013,526, filed on Jun. 17, 2014, U.S. Provisional Application No. 62/016,110, filed on Jun. 24, 2014, U.S. Provisional Application No. 62/030,606, filed on Jul. 29, 2014, all of which are hereby expressly incorporated by reference into the present application.

TECHNICAL FIELD

The present invention relates to wireless communications, and more particularly, to a method and apparatus for performing device-to-device (D2D) operation in a non-activated carrier in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. Currently, D2D operation may be performed in an activated carrier. However, a method for performing D2D operation in a non-activated carrier may need to be discussed.

DISCLOSURE OF INVENTION

Technical Problem

The present invention provides a method and apparatus for performing device-to-device (D2D) operation in a non-activated carrier in a wireless communication system. The present invention provides a method and apparatus for allowing D2D communication/discovery in a carrier which may not be activated to a user equipment (UE). The present invention provides a method and apparatus for providing necessary control signals and higher layer signaling to support D2D in a frequency which has not been activated to a UE. The present invention provides a method and apparatus for performing time/frequency synchronization when a UE performs D2D operation in a deactivated carrier/frequency. The present invention provides a method and apparatus for performing D2D operation in conjunction with cell on/off operation. The present invention provides a method and apparatus for performing D2D operation in an unlicensed carrier. The present invention provides a method and apparatus for providing a procedure of D2D allowance (to a UE).

Solution to Problem

In an aspect, a method for performing, by a user equipment (UE), device-to-device (D2D) operation in a wireless communication system is provided. The method includes receiving a signal for D2D operation, and performing the D2D operation in a non-activated carrier.

In another aspect, a user equipment (UE) incudes a memory, a transceiver, and a processor coupled to the memory and the transceiver, and configured to control the transceiver to receive a signal for device-to-device (D2D) operation, and perform the D2D operation in a non-activated carrier.

Advantageous Effects of Invention

D2D operation can be efficiently performed in a non-activated carrier.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a scenario of D2D operation according to an embodiment of the present invention.
FIG. 7 shows an example of a block diagram of a UE according to an embodiment of the present invention.
FIG. 8 shows an example of active time of TDD module in F2 according to an embodiment of the present invention.
FIG. 9 shows an example of a state-diagram of a UE state changes for D2D operation according to an embodiment of the present invention.
FIG. 10 shows an example of a method for performing D2D operation according to an embodiment of the present invention.
FIG. 11 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDCCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. It may be referred to Section 5.5 and 7.5 of 3GPP TS 36.300 V12.1.0 (2014 March). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be deactivated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

Device-to-device (D2D) operation may include D2D discovery and D2D communication. D2D discovery/D2D communication, because of its nature of operation, may work when the UE is in radio resource control (RRC) connected mode (RRC_CONNECTED) or RRC idle mode (RRC_IDLE). In other words, it may work based on very minimum support from the network. Considering limited UE radio frequency (RF) and baseband capabilities, it is desirable to utilize one RF/baseband unit for many purposes as much as possible, as long as there is no significant performance drawback and complication in terms of UE implementation. For example, if a UE is capable of 2 TX and 2 RX, to maintain the connectivity, it is desirable to maintain the connectivity with LTE network. When the UE does not have significant DL and/or UL traffic, D2D operation may be enabled in a frequency where the serving cell is operating.

Basic functionalities to enable D2D transmission (TX) may include time/frequency tracking and TX resource allocation. In terms of TX resource allocation, there are two types of operations, namely type 1 and type 2. In type 1, the network may configure resources usable for D2D discovery and/or communication which can be signaled via system information block (SIB) and each TX UE autonomously select a specific D2D TX resource from the configured TX resource pool. To acquire TX resource pool, it is expected that a UE should be able to read SIB which forwards TX resource configuration. In type 2 which is more network controlled operation, the network assigns TX resource in a UE-specific manner such that the network allocates a dedicated D2D TX resource to each TX UE. The network signaling for the UE-specific D2D TX resource allocation may be dynamic (using the physical layer signaling) or semi-static (using high layer signaling). For example, D2D discovery may be rather based on semi-static signaling to allocate the resource in a UE-specific manner, whereas D2D communication may be rather based on dynamic signaling to allocate the resource in a UE-specific manner. The current behavior of resource configuration is based on the assumption that a UE can read PDCCH from the assisting eNB/carrier or a serving cell.

Similarly, basic functionalities to enable D2D reception (RX) may include time/frequency tracking and potential RX resource pool acquisition. To acquire RX resource pool, it is expected that a UE should be able to read SIB from a serving cell which transmits the information of RX resource pool. The SIB may also include a list of RX resource pools used by neighboring cells. However, only one set of RX resource pool may be configured which is constructed such that all resources usable by neighboring cells can be monitored. When there are many neighboring cells or many potential D2D UEs, it is inefficient to monitor all possible RX resource pools. In that case, further categorization of RX resource pools based on D2D service types or applications may be also considered. In this case, the propagation of RX resource pools may follow multimedia broadcast multicast services (MBMS) structure where SIB information may broadcast a list of RX resource pools based on D2D services including D2D service IDs. Based on UEs' interests on D2D services, some RX resource pools may be monitored, whereas other resource pools may be ignored. Either way, it is assumed that the UE is informed with information of resource pools for D2D discovery and/or communication reception.

However, for D2D communication which may occur rather frequently so that it may not be effective to multiplex D2D operation and non-D2D operation in a frequency, it is desirable to utilize secondary carrier/frequency to enable D2D operation. Moreover, by a nature, at least D2D communication should exploit the proximity and to maximize the spectral efficiency, it may be considerable that relatively smaller range of communication is used for D2D communication. In other words, D2D operation may be enabled easily in high frequency, such as 3.5 GHz or 5 GHz which tends to be used for small cell scenarios. Particularly, D2D operation may be useful in a region where hotspot is not deployed due to the lack of demands, disaster, or the difficulty of installing fixed stations. Thus, in general, even though there is overlaid macro coverage, D2D operation may be enabled in a different frequency. In other words, even though a UE is in RRC_CONNECTED mode, a UE may perform D2D operation in a different frequency without any activated SCell in that frequency.

Hereinafter, a method for performing D2D operation in a non-activated carrier according to an embodiment of the present invention is described. According to an embodiment of the present invention, D2D discovery/communication may be allowed in such a frequency. More specifically, according to an embodiment, a UE in RRC_CONNECTED may perform D2D operation in a frequency/carrier where a UE is not associated with any activated SCell. One of use cases is that a UE is capable of operating in 2CC CA where a UE is connected with PCell and it has remaining RF/baseband capability which can be used for D2D operation in a deactivated carrier/frequency. Another use case is that a UE is capable of operating in 3CC CA where a UE may be configured with PCell and one activated SCell, then the remaining resource will be used for D2D operation in a deactivated carrier/frequency. More particularly, considering a case where cells may perform on/off operation in that frequency and thus a UE may not easily discover the surrounding cells, an embodiment of the present invention also discusses the UE behavior and control signaling aspects in such cases.

According to an embodiment of the present invention, how to handle the case where either there is no assisting eNB/carrier/serving cell in the D2D operation frequency/carrier or assisting eNB/carrier/serving cell cannot transmit PDCCH due to e.g. on/off operation may be considered. It is noted that reading SIB also requires reading PDCCH. Unless all necessary resources are configured by physical broadcast channel (PBCH), a UE may still need to read PDCCH for acquiring resource information for D2D operation.

In the description below, "mode 1" means a network controlled mode D2D communication. If not specified differently, type 2 described above is equivalent to mode 1 D2D communication. Also, "mode 2" means resource pool based mode for D2D communication. If not specified differently, type 1 described above is equivalent to mode 2 D2D communication. Also, D2D operation may include both D2D discovery and/or D2D communication. Type 1 D2D operation may include type 1 D2D discovery and/or mode 2 D2D communication. Type 2 D2D operation may include type 2 D2D discovery and/or mode 1 D2D communication.

In general, according to an embodiment of the present invention, a few mechanisms to find an anchor carrier which may transmit necessary signals including resource configuration information and tracking reference signal (RS) (or related information to locate a cell for tracking), so that a UE even without having an activated carrier in a D2D frequency (or in the paired DL frequency) can perform D2D operation including both transmission and reception (and also both discovery and communication) may be discussed.

In the description below, the anchor carrier or PCell may be replaced with any activated SCell if a UE is configured with any activated SCell. In other words, an embodiment of the present invention is not limited to the PCell or an overlaid macro layer. Even though a UE performs D2D operation based on the assistance from the anchor carrier, when an activated SCell is enabled in the frequency, the UE may rely on the assistance information from the activated SCell if the cell offering D2D operation is the same as the activated SCell. For example, if the SCell is deactivated, and D2D operation continues based on the assistance from the PCell, when the SCell is reactivated, the service will continue based on the assistance from the activated SCell.

On the other hand, to maintain consistent behavior regardless of SCell activation/deactivation, it may be also considered to always utilize the anchor carrier at least for type 1. For type 2, it may switch to the activated SCell. It may be further assumed that if a frequency offers D2D operation based on the assistance information from another anchor carrier (in a different frequency), a UE may assume that type 1 TX resource configurations are aligned among cells in that frequency (in other words, no need to update TX resource configuration even though the target cell becomes out-of-range) with synchronized among cells. If this is assumed, it may be also assumed that the RX resource pool is aligned and is the same as to TX resource configuration. Alternatively, similar to MBMS service, D2D area may be also utilized, which specifies D2D region where cells are collaborating to support D2D operation (and thus the same TX resource and RX resource pool is assumed). D2D region may utilize the same scrambling ID which can be used to transmit any tracking RS or D2D configuration information. Each D2D area may include a list of cells (so that a UE knows which D2D areas/services are supported by one cell).

To enable D2D operation in a frequency without activated carrier, it needs to be considered how to perform time/frequency tracking and TX/RX resource allocation (or acquisition).

At first, D2D-camp on cell among cells in a frequency may be identified. At least to enable type 2 operation, a UE needs to be camped on a serving cell so that it can monitor (E)PDCCH from the cell. Currently, a UE is supposed to monitor a SCell only if the SCell is activated or a UE is supposed to receive MBMS service(s) from that frequency. According to an embodiment of the present invention, a UE may be allowed to monitor (E)PDCCH from a cell if D2D operation is activated in that frequency by higher layer signaling if the UE is in RRC_CONNECTED. When a UE is in RRC_IDLE, it may follow behavior of RRC_IDLE.

FIG. 6 shows an example of a scenario of D2D operation according to an embodiment of the present invention. D2D UE1 is connected to a macro cell in F1 and D2D UE2 is connected to a small cell in F2. F1 and F2 may be configured by CA. In this case, if D2D operation between UE1 and UE2 occurs in F2, UE1 needs to be indicated with information regarding D2D operation in F2 by some means.

One simple approach is to give a dedicated RRC signaling regarding D2D operation in F2. Information on D2D operation, which includes at least one of TX pool (at least for type 1), RX pool, and time/frequency tracking reference cell ID (if available), may be indicated via dedicated signaling. This dedicated signaling may be configured by any serving cell (or any activated serving cell) or by an anchor carrier (in RRC_IDLE mode) or by a configured anchor cell (both in RRC_IDLE and RRC_CONNECTED). Or, it may be also forwarded by additional SIB from any serving cell (or any activated serving cell) or by an anchor carrier (in RRC_IDLE mode) or by a configured anchor cell (both in RRC_IDLE and RRC_CONNECTED).

When a UE is indicated with time/frequency tracking reference cell ID or a potential camp-on cell, it may attempt to synchronize its frequency/time against the camp-on cell. To be clear, the anchor cell, which is forwarding D2D information, may be different from time/frequency tracking cell. Time/frequency tracking may be achieved based on either reference cell (if configured) or PCell or anchor cell. It is also notable that a list of the D2D information may be signaled for one frequency. Assuming that the network may not know the close-by cell, it may transmit a list of potential cells which may serve D2D operation for the UE. Given that a UE can perform measurements, it is however desirable to limit the number of signaled cells. Based on UE measurements, the serving cell may select only a few candidate cells for tracking purpose. As mentioned above, cells may also transmit a new signal scrambled with D2D area ID such that a UE may receive tracking RS in single frequency network (SFN) manner from multiple cells. Separate TX/RX resource configuration along with cell ID (for time/frequency tracking) may be configured in that case.

When the UE is not activated with a carrier in that frequency, it is expected that timing advance (TA) value may be set as one of the followings.

Zero assuming no TA is used;
Same as TA configured in PCell;
Higher layer configured TA value (to support this, the propagation delay or offset between macro cell and small cell (PCell and a carrier) may be used to determine this value);
Computed TA value based on timing offset between PCell (or the anchor cell) and a camp-on cell (or tracking reference cell) by a UE (for example, if propagation delay between two cells is +30us, TA may be set as TA_PCell −30us assuming TX timing of two cells are aligned.)

It may be also assumed that, particularly for type 2 D2D operation which is assumed to coexist with other LTE UL traffic, TA needs to be configured to operate in UL frequency of a carrier. One mechanism is to use PRACH in the deactivated carrier or in D2D frequency where PRACH is either configured by UE-dedicated signaling (such as PDCCH order or RRC signaling) or by SIB-broadcast from the anchor carrier (or from the deactivated carrier itself). This may be limited to a case where a UE is deactivated with SCell in that frequency. Or, this may be limited to a case where a UE is always configured to use TA. Or, this may be limited to a case where a UE can locate active/inactive carrier in that frequency (in other words, not to interfere with on-going LTE traffic).

Since any UL transmission is not expected if SCell is deactivated, one of the following approaches may be considered to handle PRACH.

(1) Initiate PRACH only by PDCCH order. In fact, this PRACH may be sent to the anchor carrier UL frequency, instead of D2D UL frequency. In this case, the deactivated carrier (or a target carrier in D2D UL frequency) may monitor PDCCH order to estimate T1-T0 (where T1 is the received timing of PDCCH order in the deactivated carrier and T0 is the time where PDCCH order has been requested). Assuming that T2 is the timing of PRACH reception at the deactivated carrier, TA for deactivated carrier may be computed as T2-T1 which may be signaled to the anchor carrier from the target cell via backhaul signaling (which will be configured to the UE via higher layer signaling).

(2) Or, PRACH may be forwarded to the deactivated carrier where PDCCH order may also be generated by the deactivated carrier.

(3) Or, in deactivated carrier, type 2 operation may be disabled. More specially, type 2 operation may be enabled at least one SCell in the same TAG (with the deactivated carrier) is active.

It is also possible that there is no cell in a communication range to be used as time/frequency tracking. In that case, the reference cell ID is not configured, and then the UE may perform one of the followings.

(1) The UE may assume that it is same as out-of-coverage scenario even though it is connected to a macro layer. Thus, the operation in F2 is same as operation in out-of-coverage scenario. However, one difference to consider is that timing/frequency tracking may be achieved against PCell. Thus, it may forward synchronization information as a relay if needed. In this case, since it is rather inaccurate information, it may be deprioritized over synchronization signals based on PSS/SSS from a network operating in F2. For example, if UE2 relays synchronization after synchronize itself to F2-eNB, UE1 may put higher priority on UE2 synchronization signals, as it comes from the network-based synchronization signals. To differentiate whether the synchronization has come from the network or not, D2D synchronization sequence may be used (e.g., a set of IDs are reserved to represent synchronization signals synchronized by listening on the network). The signals from UE1, as it does not have any network source in the same frequency, may be treated with the same priority as to normal D2D (2) The UE may assume that time/frequency tracking from PCell (or the anchor cell) is valid. Depending on UE hardware capability and band-combinations between PCell and D2D carrier, there may be cases where the UE may assume that time/frequency tracking based on PCell is valid. One example is that PCell carrier and D2D carrier are intra-band carriers. In this case, most likely, frequency tracking based on PCell may be accurate. In this case, a UE may acquire timing synchronization from external source such as another D2D device. Another example is that if PCell carrier and D2D carrier are not so much apart even though inter-band case, a UE still may assume that frequency tracking from PCell is still valid. In summary, it may be up to UE implementation to determine whether it needs external source to perform time and/or frequency tracking or it may rely on PCell or any other carrier configured.

(3) When a UE is not indicated with time/frequency tracking reference cell ID, it may attempt to synchronize its frequency/time against the camp-on cell or PCell.

(4) A UE may not be supposed to perform D2D operation in that carrier, as there is no near-by cell to perform time/frequency tracking. It is however not desirable, as it limits the use-cases of D2D operation. If this option is used, a UE in RRC_CONNECTED may not perform D2D operation in a frequency if there is no candidate cell to camp-on in that frequency or if the UE is not configured with any cell in that frequency. More specifically, assuming that cells may perform on/off operation, even though there are cells nearby, a UE may not be able to acquire sufficient signals for keeping track of time/frequency tracking due to the lack of continuous RS transmission. In that case, with option (3) described above, it may be further assumed that a UE may not operate D2D operation in a frequency if there is no activated SCell associated with the UE.

The above description is focused on operation of UE in RRC_CONNECTED. For UE in RRC_IDLE, to differentiate between (1) out-of-coverage (2) cell performing on/off where in both cases a UE may not be able to receive sufficient signals, higher layer signaling to indicate which frequencies is usable for in-coverage D2D operation, and which frequencies where the network may perform on/off operations may be indicated. One candidate mechanism of ON/OFF operating frequencies may be configured or inferred from the configuration of discovery signal (or, discovery reference signal (DRS)) measurement. If in a frequency, discovery signal based measurement is configured, a UE may assume that cells in that frequency can perform ON/OFF operation. Thus, the UE may assume that, unless otherwise indicated, the cell may not transmit the necessary signals for D2D operation. For the carriers where on/off operation may occur, the UE may be configured with discovery signal configuration information such that a UE may utilize discovery signals for time/frequency tracking. More specifically, if a UE is configured with discovery signal based measurement in a given frequency where D2D operation is expected (in the same frequency by TDD or paired uplink spectrum by FDD), a UE may assume that cells in that frequency can do on/off operation. Thus, all tracking should be based on discovery signals only.

Given that a UE may be indicated with necessary information regarding TX/RX resource pools, according to an embodiment of the present invention, how to handle type 2 operation, which is more network controlled operations, may be discussed. Since a UE is in RRC_CONNECTED, it is natural to support type 2 operation, which can enhance D2D discovery/communication where the network may coordinate D2D UEs such that collisions can be reduced and efficiency can be maximized. Basic type 2 operation is based on dynamic network control.

To communicate dynamic network control, one easy way is to use cross-carrier scheduling from PCell or a serving cell, which has indicated dedicated signaling (or reference cell ID indicated by a dedicated signaling) regarding D2D operation. The issue with cross-carrier scheduling is that it uses carrier indicator field (CIF), which is mapped to SCellIndex which can be enabled only when a SCell is configured. Thus, this may not be usable if any carrier in a D2D frequency has not been configured. One simple way to address this is to use SCellIndex which is not used for SCellIndex for normal CA operation. For example, since a UE may be configured with up to 5 CCs at one time, SCellIndex=6 or 7 may be used for D2D signaling. Assuming that a UE may be supported only one D2D carrier by cross-carrier scheduling, SCellIndex may be fixed to a value such as 7.

However, it may be also possible to introduce a new DCI format to deliver D2D information. In this case, CIF may not be needed. Also, it may be further assumed that for cross-carrier scheduling perspective, a UE may monitor only DCI format 1A, DCI format 0, DCI format 1C only to monitor, e.g. SIB and DCI format 0, DCI format 4 and a new DCI format (if introduced) for D2D uplink grant. Since cross-carrier scheduling does not allow transmitting DCI in common-search space (CSS), transmitting cell-broadcast information, such as RX resource pool or TX resource pool, may be forwarded by SIB of PCell (which can be a new SIB) for D2D carrier. Or, similar to MBMS configuration, PDCCH may schedule PDSCH, which also includes information regarding D2D configuration. As mentioned above, if SIB is used, a new SIB may be used to forward D2D configuration information on behalf of other carrier(s). More specifically, to reduce UE monitoring burden, the subframes where D2D configuration may be cross-carrier scheduled may be pre-fixed or configured by higher layers. To also assist larger coverage of D2D operation, this information may be forwarded in a SFN manner by coordinated cells.

Also, if there are many D2D services, the information may be huge. To help with that, a UE may transmit interested D2D services to the network and then the network may transmit UE-specific manner configurations to the UE only for the interested D2D services. It may be further considered that there is a D2D directory service server which may forward the list of D2D services. In terms of DCI formats, since the UE does not have to monitor scheduling PDSCHs, only DCI formats related to RRC configuration and uplink grants may be looked at to reduce UE blind detection burden. It may be also considered to support semi-persistent scheduling (SPS) activation/release via cross-carrier scheduling, assuming that SPS configuration is given by higher layer signaling.

In terms of cross-carrier scheduling from PCell or a serving cell, there are a few things to clarify which may require some changes in terms of UE behavior or transmission perspective. First of all, different from normal cross-carrier scheduling which may schedule both DL and UL grant, cross-carrier scheduling used for D2D operation may be limited to UL grant if it is not scheduled for SIB transmission. In other words, there may be no case where cross-carrier scheduling of F1 schedules a data in F2 for DL. Thus, a UE may just assume that UL grant (or D2D grant) will be scheduled by cross-carrier scheduling (and thus limit to monitor only DCI format 0/4 or one or more DCI formats used for D2D grant such as SA (scheduling assignment)). This implies that a UE may monitor from the anchor carrier for PDCCH (or DCI) which may not necessarily have corresponding PDSCH. Thus, a UE may not have to buffer or perform data reception at F2 at all. For example, a UE capability in terms of RF and baseband not used for F2 may be used for some other purposes including measurement (e.g. inter-frequency measurement).

FIG. 7 shows an example of a block diagram of a UE according to an embodiment of the present invention. Referring to FIG. 7, the UE has two CC CA capability. In this case, TDD module may be used for D2D operation in F2 which is TDD-band, while FDD module may be used for normal operation in F1. All the necessary information may forwarded in F1 via cross-carrier scheduling and cross-carrier data transmission.

FIG. 8 shows an example of active time of TDD module in F2 according to an embodiment of the present invention. Referring to FIG. 8, a UE does not need to monitor the channel in inactive time for RX-module, as there is no expected data. However, the UE may use those time for other activities such as measurements/tracking. To allow this, data transmission, such as SIB to indicate TX/RX resource and timing information, may be forwarded by an anchor cell itself rather than cross-scheduled.

Furthermore, an embodiment of the present invention described above may be applied to type 1 operation. In this case, as mentioned above, the necessary information may be forwarded by an anchor carrier. Either by a new SIB or contained in existing SIB or a new channel, resource pool information may be forwarded. The detail procedure will be explained later.

When a UE performs D2D operation in a frequency without activated SCell where deactivated SCell may perform cell on/off operations, it means that a UE may need to assume that some supporting signals for time/frequency tracking may be transmitted only in configured timing for discovery signals. In that case, rough time/frequency tracking needs to be occurred in DRS transmission timings where time synchronization accuracy may not be so high. Thus, it may be considered to use extended CP for deactivated carrier, if there is a need to receive any PDCCH from the deactivated carrier. One example is to reuse MBMS framework where necessary control information is forwarded to D2D UEs via MBMS service. To minimize the necessity of reading PDCCH in a deactivated carrier, transmitting MBMS related information via UE dedicated signals from another activated carrier may be considered. For example, SIB14 to enable MBMS may be forwarded by a UE dedicated signaling. Also, it may be further considered to reserve a MBMS service and area for D2D service where each D2D UE may assume that the reserved subframes/resources may be used for type 1 operation.

In terms of the relationship between the configured resources by MBMS configuration for D2D discovery and/or communication and MBSFN subframe configuration, it may be assumed that MBMS resources used by D2D operation is not aligned with MBSFN configuration, as D2D operation utilizes UL resources whereas MBMS resource is mainly to configure DL resources. Thus, the resource configured by D2D MBMS may not be treated as PMCH resources. In that regard, it is also possible to reuse MBMS configuration framework to configure D2D discovery/communication resources, yet, it may be configured independently from MBMS configurations.

Furthermore, an embodiment of the present invention described above may be applied to a case in which a D2D operation is handled in an unlicensed carrier where active SCell may not be easily assumed. Notably, it may not be so easy to reserve any D2D resources by cell-broadcast information such as SIB/PBCH, it may be further considered that a D2D operation may be based on carrier-sensing approach in a reserved resource pool. Or, D2D operation in unlicensed carrier may be operated solely based on type 2 operation where another activated licensed carrier may cross-carrier schedule/indicate the resources of D2D in unlicensed carrier. More specifically, a D2D resource of unlicensed carrier may be cross-carrier broadcasted from an anchor carrier. It may be assumed that there is an anchor carrier for an unlicensed carrier which may be broadcasted by either the anchor cell or by other cells. An anchor cell may broadcast the information about unlicensed carrier which can be utilized for D2D operation and/or other operations such as MBMS.

One major difference from licensed carrier is that there is no guarantee that the reserved/allocated resources is usable by LTE devices due to coexistence with other unlicensed carrier users. Thus, all LTE devices may need to perform carrier sensing or may need to follow certain coexistence mechanisms. Thus, even with type 1 operation configured, a D2D device should perform either carrier sensing so that it does not interfere with on-going transmission, or it may wait control signal to allow transmission even in the reserved resources for type 1 communication/discovery. Or, if a UE is configured with type 1 resource pools, it may assume that coexistence is handled by other means, and thus it behaves without carrier sensing. Overall, to utilize unlicensed carrier even for D2D discovery/communication, some control from the network is desired.

Further, it may be assumed that a UE may not be activated with an anchor carrier. In that case, it is assumed that the anchor carrier may not perform any cell on/off operation or may transmit sufficient signals for a UE to receive PBCH, SIB, etc., for configuring D2D operations in unlicensed carrier. Thus, even though a UE is not activated with an anchor carrier, it may receive the necessary information from the anchor carrier for unlicensed carrier operation.

Overall, this may be forwarded by an overlaid macro cell. In other words, an overlaid macro cell may propagate a list of carriers/frequencies where D2D operations can be performed along with D2D configurations (such as resource pool and TX pool information, and operation mode such as type 1 or type 2). It may also propagate a list of D2D services in each frequency to assist a UE to choose appropriate frequency(s) for interested services. By this way, it may reduce the probability of out-of-coverage D2D operations as overlaid macro may cover the wide-area. For a specific frequency, if there is no information from an overlaid macro and it cannot locate any cell in that frequency, it may be considered as out-of-coverage.

Hereinafter, handling of multiple frequencies where D2D operation is feasible according to an embodiment of the present invention is described. Considering high-frequency such as 3.5 GHz or unlicensed carrier, there may be multiple carriers where D2D operations may be performed. A network may still want to control at least certain UEs to perform D2D TX operation in one or a few carriers only, even though it may allow D2D RX operation in any carrier depending on its interest. Thus, it may be assumed that a UE should be camped-on a serving cell to perform a D2D operation. This cell may be called a "paging-cell", as there should be a cell which performs paging for the UE in both RRC_CONNECTED and RRC_IDLE. The paging-cell may indicate a list of frequencies to a UE where the UE can perform D2D TX operation. For the frequencies, a UE may perform D2D TX operation following TX resource configurations. Moreover, the paging-cell may also indicate a list of frequencies to a UE where the UE can perform D2D RX operation. For the frequencies, the UE may perform D2D RX operation following RX resource pool information.

Furthermore, it may be also assumed that without explicit signaling of a list of D2D TX frequencies (allowed), a UE may assume that only the camp-on carrier or the frequency, the UE is allowed to perform D2D TX.

In summary, a normal D2D UE operation is as follows.

(1) The UE may locate a first priority frequency to see whether there is any D2D configuration available for other frequencies.

(2) If the information has been acquired in (1), the UE may initiate a D2D procedure in a frequency. First, the UE may try to perform time/frequency tracking by locating necessary signals in the frequency. If any signal is not detected, assistance from the first priority frequency (e.g., overlaid macro frequency) may be used for a rough time/frequency tracking (or alternatively, if tracking reference cell is configured, locate the reference cell for tracking purpose). Once time/frequency tracking is done, if there is an activated carrier in that frequency, the configuration from an activated carrier (including PCell) may override any configuration acquired in (1). Based on the configurations, D2D operation is proceeded.

(3) If the information has not been acquired in (1), a UE may search another frequency for D2D configuration. Each cell broadcasting D2D configuration for other carrier or frequencies may specify in which frequency the D2D configuration is applicable.

(4) If the information has been acquired in (3), the UE may initiate a D2D procedure same as (2).

(5) To determine whether type 1 or type 2 operation is used, the UE may follow the configuration from the anchor carrier. When it is configured with type 2 operation, the UE may assume that the anchor carrier will control its D2D operation in a different carrier via cross-carrier scheduling/transmission. If the UE is configured with type 1 operation, since there is not necessarily signaling to enable type 1 operation, the UE may assume that all frequencies are usable for type 1 operation if the anchor carrier broadcasts TX resource and/or RX resource pool.

For a carrier without an activated carrier, to perform D2D operation, some assumption may be considered. If a UE is not configured with any carrier in that frequency and a UE cannot locate any cell in that frequency, a UE may not assume that it will be able to receive necessary signals from the frequency. Thus, either the UE may behave as if out-of-coverage condition or the anchor cell may assist the UE to perform D2D operation in that frequency. If a UE is configured with a carrier which may perform on/off operation, a UE may support type 2 operation only if the carrier is activated. In other words, a UE may fall back to type 1 operation if a carrier is deactivated. If a UE is configured with unlicensed carrier for D2D operation, it may be assumed that all the necessary information is forwarded by an anchor carrier. Further, it may be limited to operate using type 2 operation unless it is configured otherwise.

If a UE is configured with a carrier which is deactivated (regardless of whether the cell performs on/off operations), in terms of assumption when D2D operation is feasible, the following options may be considered.

(1) D2D operation based on type 1 operation may not be allowed if the carrier is deactivated.

(2) D2D operation based on type 1 operation may be allowed if the carrier is deactivated without explicit signaling, as long as the UE indicated with that the frequency/carrier supports type 1 operation. In terms of indication, it may follow the serving cell's SIB or anchor cell's SIB or dedicated signaling.

(3) D2D operation based on type 1 operation may be allowed if the carrier is activated and the UE is indicated by higher layer to enable D2D operation even in deactivated carrier. In terms of indication, it may follow the serving cell's SIB or anchor cell's SIB or dedicated signaling.

(4) D2D operation based on type 1 and/or type 2 operation may be allowed even if the carrier is deactivated without explicit signaling. In this case, a UE may assume that, as mentioned above, type 1 operation is enabled when the carrier is deactivated. For type 1, it may be applied only if the carrier/frequency supports type 1 operation.

(5) D2D operation based on type 1 and/or type 2 operation may be allowed even if the carrier is deactivated with explicit signaling. In this case, a UE can assume that, as mentioned above, type 1 operation is enabled when the carrier is deactivated with explicit higher layer signaling. The higher layer signaling may also indicate whether type 1 or type 2 is used for deactivated carrier. For type 2 operation, it may be assumed that the anchor carrier may schedule resources/data. For type 1 operation, it may be applied only if the carrier/frequency supports type 1 operation.

More generally, a UE may assume that it can perform D2D operation when one or some of the following conditions are met.

(1) A UE is configured with a cell and the cell is activated (at least for DL if D2D operation occurs at the paired UL spectrum or in the same frequency) and the cell broadcasts D2D related operation. In this case, a UE may be signaled with a dedicated signaling to enable or disable D2D operation (at least for type 1 discovery and mode 2 communication).

If a UE is not allowed to perform D2D operation and if the carrier is deactivated (such as via deactivated media access control (MAC) control element (CE)), the UE may stop D2D operation, even though the carrier broadcast D2D related information in its SIB. In this case, it may be interpreted as if D2D operation may be activated/deactivated via carrier activation/deactivation commands. More specifically, the UE may disable discovery if it was configured with type 2 discovery. If it is configured with type 1 discovery, the D2D operation may continue regardless of cell-state. For the communication, the UE may disable communication if mode 1 communication is configured and if the carrier is deactivated. If the UE is configured with mode 2 communication, it may continue regardless of cell state.

Furthermore, D2D operation may be hold if a UE is configured with discontinuous reception (DRX). At least, mode 1 communication or type 2 discovery may be stopped during DRX off duration. It may be further considerable that a UE autonomously switch to type 1 discovery and/or mode 2 communication in DRX off duration or when a UE is configured with DRX. Another alternative is to allow type 2 discovery and/or mode 1 communication in DRX environment in a limited manner where related DCI may be transmitted during DRX on duration. In other words, the UE may monitor any downlink DCI in DRX on duration only including D2D grants. In that sense, in terms of D2D enabling/disabling signaling, the priority order may be set as (carrier activation/deactivation >UE-dedicated signaling to enable/disable D2D operation (if any)> D2D related information and enabling procedure in SIB). Furthermore, for type 1 discovery and/or mode 2 communication, it may continue regardless of cell state, thus, the priority described above may be limited to only type 2 discovery and/or mode 1 communication. Also, for both categories, DRX may have the highest priority to determine whether type 1/mode 2 may be applied or not.

(2) A UE is configured with a cell and the cell may not be activated (at least for DL if D2D operation occurs at the paired UL spectrum or in the same frequency), however, the cell broadcasts D2D related information and enable D2D procedure. In this case, in terms of D2D enabling/disabling signaling, the priority order may be set as (UE-dedicated signaling to enable/disable D2D operation >D2D related information and enabling procedure in SIB> carrier activation/deactivation). Furthermore, for type 1 discovery and/or mode 2 communication, DRX may have the highest priority to determine whether type 1 discovery/mode 2 communication may be applied or not.

(3) A UE is configured with an anchor cell which may not be operating in the same frequency or the paired DL frequency of D2D frequency and the UE is not configured with any carrier in the same frequency with D2D or the paired DL frequency of D2D frequency, however, the anchor carrier transmits D2D related information and enable D2D carrier transmits D2D related information and enable D2D procedure for the target D2D frequency. In this case, activation/deactivation states of a carrier in the same frequency may not be so relevant. If the UE is configured with a carrier, the UE may switch to first or second case described above. Thus, in this case, the priority may set as (UE-dedicated signaling to enable/disable D2D operation (if any) >D2D related information and enabling procedure in SIB).

In general, if a UE is allowed to operate D2D TX or RX in a carrier without any activated carrier, one of the following approaches may be considered according to an embodiment of the present invention.

(1) Perform D2D operation including type 1 and type 2 only based on the anchor cell control: By including potentially time/frequency tracking and receiving type ½resource information, the anchor cell may behave as if it is main serving cell for D2D operation. In this case, unless the anchor cell changes, D2D information may be maintained, even though the deactivated carrier becomes out-of-sight from the UE or UE moves. In other words, the association with deactivated carrier (from a D2D operation perspective) may not be assumed.

(2) Perform D2D operation of type 1 only based on the anchor cell control: It may be assumed that type 2 may be activated only if there is activated carrier in the frequency (or paired downlink frequency).

(3) Perform D2D operation of type 1 and potentially type 2 based on the anchor carrier and a target carrier in the frequency of D2D operation (or paired downlink frequency): In this case, D2D operation may be continued or activated only if either a UE is activated or configured with a carrier in a D2D frequency. Or, a UE may identify a target carrier and camp-on that carrier. The camp-on carrier may transmit necessary D2D information such as TX/RX resource information via SIB (or other dedicated signaling). When a UE moves and thus the target carrier needs to be changed, it may change the camp-on cell. Since the target carrier is not activated, a UE may not be able to receive type 2 or updated of TX/RX resource information. In this case, it may be allowed that the anchor cell transmits the necessary information. In this case, the target cell may assign the anchor cell (cell used for control when the target cell becomes inactive or moved out-of-the-range). In other words, a UE may perform some or all RRC_IDLE functionality (such as cell reselection) in the frequency where a UE performs D2D without any activated carrier. This may be limited to a case where a UE is operating type 2 discovery/communication which requires a UE to receive control information from a target cell.

This may be applicable to PCell as well.

FIG. 9 shows an example of a state-diagram of a UE state changes for D2D operation according to an embodiment of the present invention. At state 90, the UE is in RRC_IDLE. When PCell is configured or SCell is activated, at state 91, the UE moves to RRC_CONNECTED.

When type 1 operation is configured, at state 92, the UE moves to in RRC_CONNECTED type 1 D2D operation. When SCell is deactivated, at state 94, the UE moves to D2D_CampOn_State. In D2D_CampOn_State, which indicates a state where a UE can perform D2D type 1 operation, the information (such as RX/TX resource information) may be forwarded by the camp-on carrier (for example PCell or an anchor carrier). The anchor carrier when forwards the information may also indicate whether a UE can perform TX and/or RX in a certain frequency. D2D resource pool and information may be forwarded by the anchor carrier via SIB or dedicated signaling. The anchor carrier may indicate whether D2D TX and/or RX is enabled (or allowed for a UE) per frequency via SIB or dedicated signaling (also the starting time/offset and/or duration can be configured for D2D operation if allowed). The UE may perform cell (re)selection to identify the anchor carrier (similar to maintaining paging range). The UE may perform tracking based on the anchor cell.

When type 2 operation is configured, at state 93, the UE moves to RRC_CONNECTED type 2 D2D operation. When SCell is deactivated, at state 95, the UE moves to D2D_RRC_IDLE. In D2D_RRC_IDLE, which indicates a state where a UE can perform D2D type 2 operation, the information and control information may be forwarded by the anchor carrier (for example PCell). The anchor carrier may be reconfigured or reselected as if RRC_IDLE. D2D grant (such as SA) may be scheduled by the anchor carrier. Frequency tracking may be done based on the anchor carrier or a target carrier in D2D frequency. Configuration (related to D2D operation) may be configured by the anchor carrier.

Type 1 and type 2 may be applied for discovery and communication, respectively. Thus, for discovery, the UE may in D2D_RRC_IDLE, whereas for communication, the UE may in D2D_CampOn_State.

In general, the necessary information to allow D2D operation may be forwarded by an anchor carrier via broadcast or dedicated signaling. When a UE is out-of-range from the anchor carrier, unless the UE may find another anchor cell, the UE may not perform D2D operation unless the UE can operates in out-of-coverage fashion in that frequency.

FIG. 10 shows an example of a method for performing D2D operation according to an embodiment of the present invention. In step 5100, the UE receives a signal for D2D operation. In step 5110, the UE performs the D2D operation in a non-activated carrier. The UE may be in a RRC_CONNECTED or RRC_IDLE. The D2D operation may include at least one of a D2D discovery or a D2D communication. The D2D operation may include at least one of a D2D transmission or a D2D reception. The D2D operation may include at least one of a type 1 D2D operation or a type 2 D2D operation. The signal may be received from an anchor carrier which is an activated carrier. The anchor carrier may be a PCell or an activated SCell. The signal, which may be higher-layer signaled, may allow the UE to monitor a (E)PDCCH, when the D2D operation is activated in the non-activated carrier. The signal, which may be dedicated-signaled, may include at least one of a D2D transmission resource pool, a D2D reception resource pool, or a time/frequency tracking reference cell ID. The UE may further perform time/frequency tracking for the D2D operation. The time/frequency tracking for the D2D operation may be performed in a DRS transmission timing. The non-activated carrier may be an unlicensed carrier. Further, the embodiments of the present invention described above may be applied to this embodiment of the present invention Hereinafter, a D2D dedicated carrier according to an embodiment of the present invention is described.

In a near future, it may be considered to define a D2D dedicated where only D2D operation will be performed. The benefits of having a D2D dedicated carrier is that there is no need of handling collision between wide area network (WAN) and D2D traffic. A D2D dedicated carrier may be set as one of the followings.

Dedicated frequency, which is always available: It may be assumed that the carrier is dedicated for D2D operation.

Dedicated frequency, which is available based on (semi-)static time partitioning: It may be assumed that the carrier is dedicated for D2D operation in some timing based on in-prior or semi-static TDM.

Dedicated frequency, which is available based on the existence of primary user: It may be assumed that the carrier is dedicated for D2D operation if there is no primary user. One example of primary user includes Wi-Fi devices if used in unlicensed carrier or primary use in a shared access licensed carrier or TV-broadcast/channels in a TV white spaces.

Dedicated frequency with TDD type where ULs are dedicated to D2D (in other words, traffic coexistence between LTE UL and D2D would not be handled)

If there is a D2D dedicated carrier, one characteristic of such a carrier is that a UE may not expect any LTE DL traffic in that frequency, unless an eNB may encapsulate LTE traffic in a D2D format or D2D fashion. In this case, similar to type 1 operation, the network may configure SA to other UEs based on the information to enhance the communication/discovery resource efficiency and/or it may transmit tracking signals for other UEs. From a UE hardware perspective, thus, it is not necessary to monitor paired DL LTE carrier. Thus, hardware component to support the D2D dedicated carrier may be simplified compared to LTE carrier. One example is to reduce the soft buffer size, if the number of HARQ processes may be limited or the maximum transport block (TB) size may be limited. Also, depending on the maximum modulation and coding scheme (MCS) and/or the number of layers, further reduction in terms of the required soft buffer size may be reduced. Moreover, it may be also assumed that the RX resource pool is known in prior of the transmission. Thus, a UE may perform autonomous DRX based on the RX resource pool configuration/information, rather than depending on DRX configuration by the network. In other words, the UE may not have to monitor a frequency continuously. When a UE is configured with type 2 operation for a D2D dedicated carrier, it may still follow DRX configuration by the anchor carrier which is controlling type 2 resource.

From an eNB perspective, to operate the D2D dedicated carrier, first it needs to inform the type of carrier or the list of the D2D dedicated carriers used by D2D services. To limit the use of D2D service by unsubscribed user, it may be assumed that the list may be only transmitted by dedicated signaling or paging. Or, information about dedicated carriers may be forwarded by SIB.

When the D2D dedicated carrier is used, it may be also considerable to use periodic or aperiodic synchronization signals transmitted by the network, which could be different from normal LTE downlink signals. One simple approach is to allow the network becomes a D2D UE which transmits synchronization signals (which resembles synchronization signals in out-of-coverage) in a periodic fashion. The information of RX resource pool to be able to receive synchronization signals may be configured by the anchor cell. The synchronization signal may be scrambled with cell ID so that other UEs know that the signal is transmitted by the network.

Furthermore, a paired spectrum may be also used for D2D dedicated carrier where a UE may be equipped with both RX and TX in a different frequency (such as DL and UL respectively) to allow full-duplex D2D operation. However, two UEs using the same frequency as TX frequency may not be able to communicate each other. Thus, some type of frequency switching based on either timing or configuration may be necessary to allow all UEs to communicate each other.

To reflect the type correctly, in terms of the D2D dedicated carrier, the following information may be considered.

UL only carrier: assumes D2D operates in UL frequency

DL only carrier: assumes D2D operates in DL frequency

UL/DL paired spectrum: may use only UL frequency or it may also include a list of D2D services used in each frequency of UL or DL respectively Type 1 only carrier: anchor carrier needs to be informed (or anchor carrier forwards information about type 1)

Type 2 only carrier: anchor carrier needs to be connected/associated/camped-on (if camp-on carrier can be supported, paging-type indication of type 2 D2D grant may be considered)

Both type 1/type 2 carrier

Discovery only carrier: it may also indicate a frequency used for communication

Communication only carrier: it may also indicate a frequency used for discovery (or based on pre-determined device information)

Both discovery/communication carrier

TDD DL/UL configuration if TDD UL is used for the D2D dedicated carrier

When TDD UL subframes are used for the D2D dedicated carrier, it may be assumed that TA is set to zero. This may be applied for other dedicated carrier as well (set initial TA=0 regardless of type). The carrier may be configured as DL-only carrier as SCell to a UE. In this case, D2D configurations including resource pool information and tracking RS may be received in DL subframes. Moreover, with TDD DL/UL configuration, without separate configuration of TX and/or RX pool, if the carrier is indicated with the D2D dedicated carrier, a UE may assume all UL subframes may be used for D2D operation. For uplink pilot time slot (UpPTS), only PRACH-like and/or SRS-like channels may be transmitted (PRACH for resource request for example and SRS for channel quality monitoring for example).

When this is used, further enhancements to LTE TDD for DL-UL interference management and traffic adaptation (eIMTA) type dynamic reconfiguration of UL/DL configuration may be considered where D2D resources may be changed dynamically following the same timing as in eIMTA. A UE may be configured with eIMTA enabling or configured to monitor reconfiguration DCI if this is activated. All other functionalities such as power control may be disabled. When reconfiguration DCI reception fails, it shall fall-back to DL HARQ-ACK reference timing configuration which may configure the smallest or the least UL subframes (and thus the least D2D resources). Or, it may be also considered to configure a UE with fall-back DL/UL configuration for D2D operation (such as DL/UL configuration 5). Alternatively, a UE may assume that no UL is usable for D2D operation until valid reconfiguration DCI will be received.

Alternatively, different from the description above, for the simplicity, it may be also considered that D2D operation (at least D2D TX operation) may be limited to PCell carrier (uplink frequency) if a UE is in RRC_CONNECTED. If a UE is in RRC_IDLE, it may operate with RRC_IDLE behavior.

It is noted that the embodiment of the present invention described above may be applied for MBMS services including dedicated-MBMS carrier. Furthermore, the embodiment of the present invention described above may be applied to both D2D broadcast and unicast.

Furthermore, it may be also considered that a UE, which is capable of full duplex between DL and UL, may perform D2D operation in the D2D dedicated carrier. If a UE is half-duplex where DL and UL cannot be performed simultaneously over different carriers, network may configure D2D resource not to interfere with DL. A UE can put higher priority on D2D resource (if configured by type 1 or indicated by type 2 operation) than LTE DL traffic in this case assuming D2D resource is scheduled.

FIG. 11 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a user equipment (UE), a device-to-device (D2D) operation in a wireless communication system, the method comprising:

receiving a signal for D2D operation from an anchor cell which is an activated cell, wherein the signal for D2D operation includes a time/frequency tracking reference cell identifier (ID), and scheduled resources for a non-activated cell;

synchronizing time/frequency based on the time/frequency tracking reference cell ID; and performing the D2D operation in the non-activated cell based on the scheduled resources, upon the synchronizing of the time/frequency.

2. The method of claim 1, wherein the UE is in a radio resource control (RRC) connected mode and/or in a RRC idle mode.

3. The method of claim 1, wherein the D2D operation includes at least one of a D2D discovery or a D2D communication.

4. The method of claim 1, wherein the D2D operation includes at least one of a D2D transmission or a D2D reception.

5. The method of claim 1, wherein the D2D operation includes at least one of a type 1 D2D operation or a type 2 D2D operation.

6. The method of claim 1, wherein the anchor cell is a primary cell (PCell) or an activated secondary cell (SCell).

7. The method of claim 1, wherein the signal for D2D operation allows the UE to monitor a physical downlink control channel (PDCCH) or an enhanced PDCCH (EPDCCH) when the D2D operation is activated in the non-activated cell.

8. The method of claim 7, wherein the signal for D2D operation is received via higher-layer signaling.

9. The method of claim 1, wherein the signal for D2D operation includes at least one of a D2D transmission resource pool or a D2D reception resource pool.

10. The method of claim 1, further comprising performing time/frequency tracking for the D2D operation.

11. The method of claim 10, wherein the time/frequency tracking for the D2D operation is performed in a discovery reference signal (DRS) transmission timing.

12. The method of claim 1, wherein the non-activated cell is related to an unlicensed carrier.

13. A user equipment (UE) comprising:
a memory;
a transceiver; and
a processor coupled to the memory and the transceiver, and configured to:
control the transceiver to receive a signal for device-to-device (D2D) operation from an anchor cell which is an activated cell, wherein the signal for D2D operation includes a time/frequency tracking reference cell identifier (ID), and scheduled resources for a non-activated cell;
synchronize time/frequency based on the time/frequency tracking reference cell ID; and
perform the D2D operation in the non-activated cell based on the scheduled resources, upon the synchronizing of the time/frequency.

* * * * *